United States Patent [19]

Föller

[11] Patent Number: 5,040,156

[45] Date of Patent: Aug. 13, 1991

[54] ACOUSTIC SENSOR DEVICE WITH NOISE SUPPRESSION

[75] Inventor: Dieter Föller, Weiterstadt, Fed. Rep. of Germany

[73] Assignee: Battelle-Institut e.V., Frankfurt am Main, Fed. Rep. of Germany

[21] Appl. No.: 545,531

[22] Filed: Jun. 29, 1990

[30] Foreign Application Priority Data

Jun. 29, 1989 [DE] Fed. Rep. of Germany ....... 3921307

[51] Int. Cl.[5] .............................................. G01S 3/80

[52] U.S. Cl. .................................... 367/118; 367/901; 367/1

[58] Field of Search ............... 367/118, 124, 126, 129, 367/901, 1; 181/206; 381/94, 71

[56] References Cited

U.S. PATENT DOCUMENTS 2,043,416 6/1936 Lueg ...................................... 367/1
4,473,906 9/1984 Warnaka et al. .................... 181/206
4,805,733 2/1989 Kato et al. .......................... 181/206

FOREIGN PATENT DOCUMENTS 17896 7/1986 Austria .
3025391 1/1982 Fed. Rep. of Germany .
3133107 3/1983 Fed. Rep. of Germany .

*Primary Examiner*—Daniel T. Pihulic
*Attorney, Agent, or Firm*—Spencer & Frank

[57] ABSTRACT

Acoustic sensor device with noise suppression, in particular for sensors arranged on a noise-generating aggregate, using a double sensor (M1, M2) located between a noise source (S) and an object emitting the sound to be picked up, one of the sensors (M1) being directed towards the noise source (S) and supplying to a control circuit (R) a noise signal which controls an anti-noise source (A) in such a way that it generates an anti-phase sound $p_A$ for compensating the noise $p_S$, the other sensor (M2) being directed toward the object to be measured and supplying a measuring signal in which the noise fraction is highly weakened and the useful sound fraction is barely weakened, so that the acquisition range of the sensor (M2) is extended as a result of this reduction of sound fractions as a function of the direction of arrival.

8 Claims, 2 Drawing Sheets

ACOUSTIC SENSOR DEVICE WITH NOISE SUPPRESSION

BACKGROUND OF THE INVENTION

The invention relates to acoustic sensor devices with noise suppression to pick up the useful sound emitted by an object, and more particularly to sensor devices arranged on a noise-generating aggregate. Due to the noise level produced by the carrier aggregate for the sensor device at the sensing location, the acquisition range, i.e. the range for acoustic detecting and locating, of the sensor or the sensors of the device for measurement of the object sound is limited.

Passive noise suppression measures naturally have the disadvantage that not only the undesired noise is weakened, but also the useful sound from an object which is to be picked up is weakened. The active anti-noise systems described in the literature, for noise reduction, weaken or even compensate the entire sound field around the point under consideration, irrespective of its origin, by superposing upon it an anti-phase sound field. These anti-noise systems likewise reduce in an unfavourable manner both noise and useful sound because the sound from the object and the undesired noise are treated equally as far as suppression is concerned. Even if enough information is available either on the noise source or on the object emitting the useful sound to distinguish between useful signals and noise signals, for example by means of frequency-selective measures such as using adaptive digital filters, it cannot be avoided that the useful signal is weakened to a certain extent by the anti-phase sound, even though the noise can be weakened more selectively in this way.

To generate compensating oscillations or anti-phase signals, control circuits have previously been used to which the signal received by a sensor was supplied and which adjusted an anti-noise source on the basis of this signal. An example of this can be found in the German Patent No. DE 30 25 391 C2. In the device described in this patent a setting signal is supplied to the control circuit electro-acoustically, which setting signal represents the useful signal that varies over time and upon which the airborne noise signal coming from outside is superposed. The resulting oscillation, which is received by a microphone, is weighted by means of a linear filter and continuously compared with the setting signal. When a suitable frequency is chosen for the feedback path and for transmission of the useful signal, the interfering oscillation is successfully reduced and the useful signal is maintained in the resulting signal to a more or less satisfactory extent. However, this circuit does not work when both, the noise signal and the useful signal arrive through the air.

Another prior art device, German Published Patent Application No. DE 31 33 107 A1, does not solve the above problems, either. In the personal sound protection device proposed in this patent document, two microphones of different directional characteristics are directed toward one side. Because of the different directional characteristics, the noise and useful signal fractions differ in the electric signals supplied by the microphones if undesired noise and useful sound arrive from different directions. The two signals are supplied to a differential amplifier whose output signal is supplied to an output amplifier and represents the picked-up and selected useful signal, which is fed into an ear muff. Efficient suppression of undesired noise with maintenance of the maximum possible fraction of useful sound is possible only by means of different manual setting of the two microphone amplifiers.

The proposed control of the differential signal after low-pass filtering makes an efficient contribution only at specific interfering frequencies. This is effected by using a control circuit to return the voltage generated at the low-pass filter to the amplifier of the microphone which picks up mainly noise fractions, and by readjusting amplification until the low-pass voltage has decreased below a predetermined value. Apart from the fact that this measure is suited exclusively for low-frequency noise fractions and exclusively for higher-frequency useful sound fractions, it cannot be avoided that the sound fractions that are inevitably contained in the two signals are lost during subtraction. Even if the microphone amplifiers are set manually, this cannot be completely avoided. Such manual setting is suited only for personal sound protection by means of ear muffs, and not for a sensor device for detecting and locating useful sound.

SUMMARY OF THE INVENTION

The object of the present invention is to provide an acoustic sensor device for picking up useful signals from an object. This sensor device, although it is arranged on or near a noise source, assures that the undesired noise from the noise source is weakened to a large extent, while the useful sound emitted by the object remains unaffected as far as possible and can thus be received over a larger range.

The above object and other advantages are achieved according to the present invention by an acoustic sensor device for picking up the useful sound emitted by an object, in order to detect and locate the object within the maximum possible range which comprises: a double sensor arranged between a noise source and the object, with one of the sensors being directed such that it picks up essentially the sound from the object arriving from the front, and with the other sensor being directed such that it picks up essentially the noise arriving from behind from the noise source; a control circuit which is connected to the sensor that picks up the noise and which adjusts a known anti-noise source which is arranged between the double sensor and the noise source and emits anti-phase sound towards the front, with the control circuit including means, responsive to the noise signal which arrives from the noise pickup sensor, for controlling the anti-phase sound source such that it generates an anti-phase sound signal for substantially compensating the noise to reduce the noise signal substantially to zero; and, means for picking up a sound acquisition signal at the sensor which is directed forward, which is not connected with the control circuit and wherein, due to the directionality of the sensors and a related difference in noise and sound control by the circuit consisting of the noise pickup sensor, of the control circuit and of the anti-noise source, the noise is weakened substantially, but the useful sound is weakened only slightly, by the generated anti-phase sound.

Contrary to the present state of the art, and due to the double sensor whose two individual sensors are positioned between the noise source and the object to be measured and directed towards the noise source and the object, respectively, the sensor device according to the invention distinguishes sounds ranging between useful sound, which chiefly arrives from the front, and noise, which chiefly arrives from behind. Using only one of the two sensors for control purposes permits directional noise suppression, so that extensive frequency-selective measures can be omitted by which useful sound and undesired noise are distinguished subsequently, during signal processing.

As, according to the invention, the tasks of controlling noise suppression and picking up of useful sound are assigned to a feedback control sensor and an acquisition sensor, respectively, effective noise suppression can be achieved in a simple way in the control circuit which is only connected with the feedback control sensor. Due to the directionality of the two sensors, the useful sound fraction in the signal supplied by the acquisition sensor is barely weakened, while the noise fraction is actively and efficiently suppressed by means of anti-phase sound, which means that the acquisition range of the whole sensor device is extended.

In contrast to the prior art, the sensor device according to the invention, because it completely separates the of control circuit sensor and useful sound sensor for noise of all possible frequencies and useful sound even of completely unknown origin, permits useful signals to be picked up over a wide range without extensive frequency-selective measures, using effective, direction-dependent noise suppression.

In the simplest embodiment, two antiparallel directional microphones, preferably with cardioid characteristics, are used for the double sensor. However, it is also possible, for example, to direct the acquisition sensor not exactly forward and to use other directional characteristics that are specially designed for the sound field from the object. The same applies to the feedback control sensor for the noise source.

The device according to the invention is particularly suitable for sensors arranged on noise-generating carrier aggregates; these sensors become significantly less sensitive to the noise level generated by their own carrier aggregates. On the other hand, the sensor device according to the invention also has an improved acquisition range for other noise sources whose noise arrives chiefly from behind.

In both cases: either when the noise and/or useful signals are known or when the sound-emitting objects and/or the noise sources are absolutely unknown, is it possible to tune the sensors to identical or to appropriately differing frequency ranges. The noise-to-sound damping ratio that ultimately remains in the useful signal can be further improved in this case.

Furthermore, it is advantageous if the entire noise suppression unit, including the anti-noise source, the control circuit and the double sensor located in the radiation range of the anti-noise source, is swivellable so that it can be optimally oriented between the noise source and the object.

Another possibility is to combine several such units which differ in terms of directionality and frequency-selectivity of the sensors, and which yield comprehensive results for a large variety of objects and noise sources.

BRIEF DESCRIPTION OF THE DRAWINGS

The following is a more detailed description of the invention with reference to the accompanying drawings in which FIGS. 1 and 2 schematically show two embodiments of an acoustic sensor device according to the invention.

DETAILED DESCRIPTION OF THE PREFERRED EMBODIMENT

Figure 1:
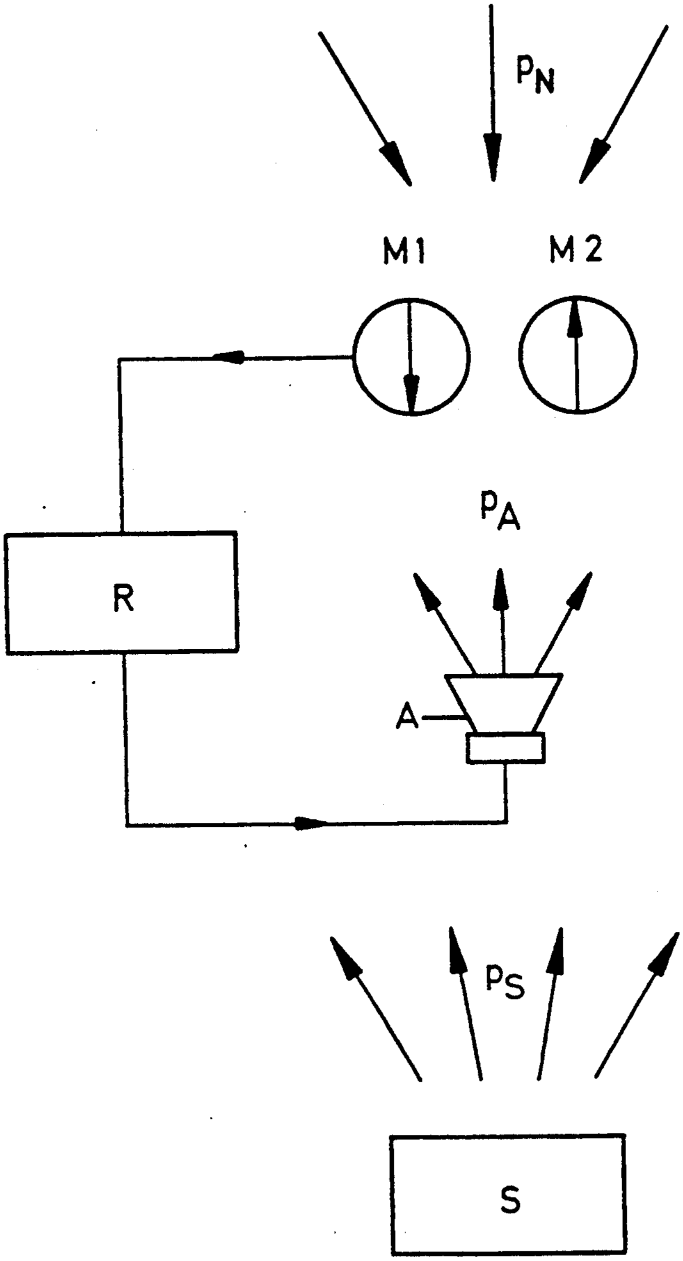

The double sensor which is schematically represented in FIG. 1 and which comprises two antiparallel directional microphones M1 and M2 is arranged on a noise-generating aggregate which is not depicted, for example some sort of machine or vehicle, so that it picks up the undesired noise $p_S$ from the noise source S from behind and the object or useful sound $p_N$ from the front.

The microphone M1 directed towards the noise source S is connected with a control circuit R, which in turn controls the anti-noise source A. The anti-noise source A is arranged between the noise source S and the double sensor so that the latter is located in the radiation range of the anti-noise source. The microphone M1 that belongs to the anti-noise system picks up the undesired noise $p_S$ unweakened, while the useful sound $p_N$ from the object is weakened in accordance with the front-to-rear ratio of the microphone as a result of its directional characteristic. The sound recorded by the microphone M1, which is essentially the undesired noise $p_S$, is passed on to the control circuit R which uses this noise signal to adjust the anti-noise source A in such a way that the latter generates the anti-phase sound $p_A$ that is necessary for compensating $p_S$.

The control circuit R, which controls the received noise signal to zero by means of the anti-noise source, consists of filter networks and amplifiers which are so dimensioned that the control circuit remains stable in the designed frequency range.

The microphone M2, which is directed towards the object to be measured and away from the noise source S, assumes the sensing task proper and picks up the useful sound $p_N$ from the object unweakened and the undesired noise $p_S$ weakened, according to the directivity.

Analysing the control circuit made up of the microphone M1, the control circuit R and the anti-noise source A yields the following equation for the sensor signal U measured by M2:

$$U \sim p_N(1-H/r^2)+p_S(1-H)/r, \tag{1}$$

where H is the closed-loop gain of the control circuit and r is the front-to-rear ratio of the two directional microphones as defined for antennas.

Equation (1) shows that, as a result of the front-to-rear ratio r of the microphones, the control circuit penetrance differs for $p_N$ and $p_S$, so that the sound from the object $p_N$ is weakened only slightly, while the noise $p_S$, is weakened considerably, as is desired.

Thus, the sound fractions at the sensing point are reduced as a function of the direction from which they arrive. This means that the forward acquisition range of the acoustic sensor device is increased by actively reducing the undesired noise from behind by means of anti-phase sound. As a consequence, the acoustic sensor device becomes less sensitive for the noise level of its own carrier aggregate.

Figure 2:
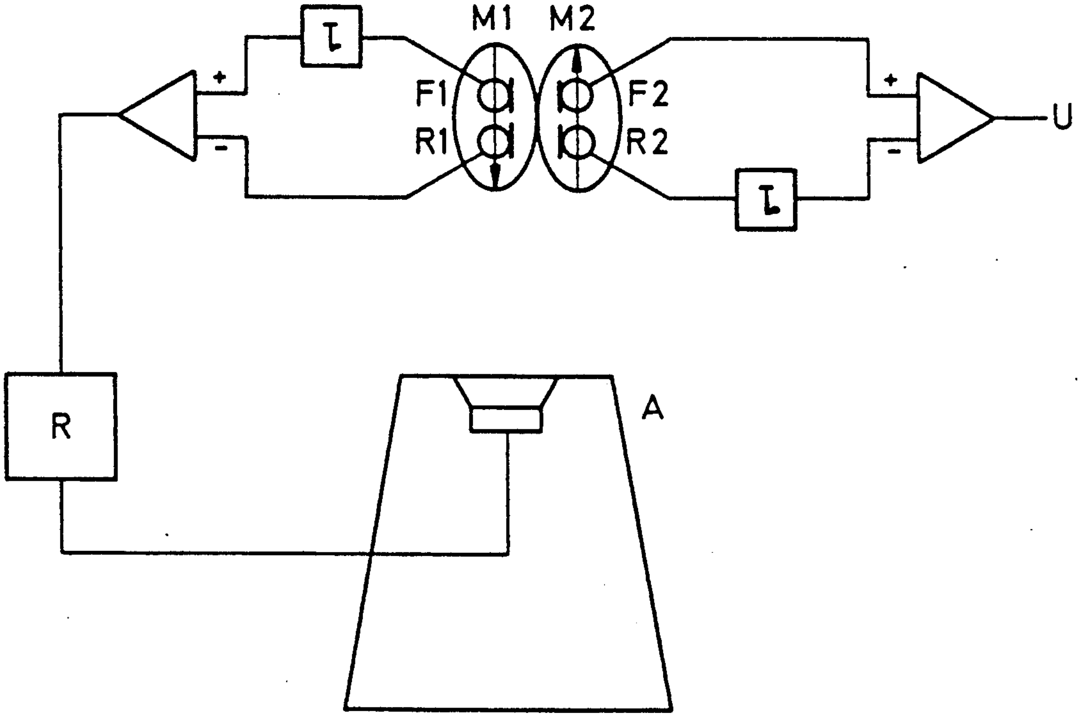

In the embodiment of FIG. 2, an arrangement of four microphones (e.g., B&K 4181) with omnidirectional characteristics is used for the pair of antiparallel directional microphones M1 and M2. If the front and the rear microphones are designated by F1 and F2 and R1 and R2, respectively, the above-mentioned antiparallel cartioid characteristics F1 - R1 and F2 - R2 are obtained by using two electronic delay sections (CCD) to delay F1 with respect to R1 and R2 with respect to F2 by a time interval T, according to their respective spacings. The anti-noise source A consists of a 100-W loudspeaker in a rotationally symmetrical conical casing (e.g., having a length, a diameter D=420/580 mm) and is arranged at a spacing of 600 mm from M1, M2. The control circuit consists of band-pass-limiting and phase-shifting amplifiers, a summing amplifier and the power amplifier for the anti-noise source A.

The pair of antiparallel directional microphones M1 and M2 in the embodiment are microphones with cartioid directional characteristics. However, other directional characteristics are also possible, and in order to achieve optimum orientation towards the sound field from the object and the noise source, respectively, the two sensors may even have different characteristics. The same applies to the frequency ranges of the inward or outward directed sensors, which are preferably independent of each other for frequency adjustment.

The device shown in the figure, which comprises the double sensor, the control unit and the anti-noise source, is preferably designed to be swivellable so that it can be adjusted to different arrival directions.

The universal usefulness of the sensor device according to the invention for a large variety of tasks and sound conditions can be improved even further by combining several such direction-and/or frequency-selective devices of the type described above.

We claim:

1. Acoustic sensor device for picking up the useful sound emitted by an object, in order to detect and locate the object within the maximum possible range, comprising:

a double sensor arranged between a noise source and the object, with one of the sensors being directed such that it picks up essentially the sound from the object arriving from the front, and the other sensor being directed such that it picks up essentially the noise arriving from behind from the noise source;

a control circuit which is connected to the sensor that picks up the noise and which adjusts a known anti-noise source, said anti-noise source being arranged between the double sensor and the noise source and emitting anti-phase sound toward the front, with said control circuit including means, responsive to the noise signal which arrives from the noise pickup sensor for controlling the anti-phase sound source such that it generates an anti-phase sound signal for substantially compensating said noise to reduce said noise signal substantially to zero, and means for picking up a sound acquisition signal at the sensor which is directed forward, which is not connected with the control circuit and wherein, due to the directionality of the sensors and a related difference in noise and sound control by the circuit consisting of the noise pickup sensor, of the control circuit and of the anti-noise source, the noise is weakened substantially, but the useful sound is weakened only slightly, by the generated anti-phase sound.

2. Acoustic sensor device as claimed in claim 1, wherein said double sensor is a pair of antiparallel directional microphones, one of these microphones being directed outward towards the object and the other microphone, which is connected with said control circuit, being directed inward towards the noise source and said anti-noise source.

3. Acoustic sensor device as claimed in claim 2, wherein the directional microphones have a cartioid directional characteristic.

4. Acoustic sensor device as claimed in claim 1, wherein the two sensors of the double sensor have alternatively identical or different directional characteristics.

5. Acoustic sensor device as claimed in claim 1, wherein the two sensors of the double sensor can be tuned alternatively to identical or different frequency ranges.

6. Acoustic sensor device as claimed in claim 1, wherein the device consisting of said double sensor, said control circuit and said anti-noise source is a swivellable unit.

7. Acoustic sensor device consisting of a combination of various direction- and/or frequency-selective devices made up of a double sensor, control circuit and an anti-noise source as claimed in claim 1.

8. An acoustic sensor device for picking up useful sound emitted by an object, in order to detect and locate the object, and adapted to be arranged between the object and a noise source, said device comprising:

a double sensor having first and second sensors, said first sensor being directed in a forward direction so that it essentially picks up sound from the object and said second sensor being directed in a rearward direction so that it essentially picks up noise emitted from the noise source.

an anti-noise source, disposed to the rear of said double sensor, for emitting anti-phase sound signals in said forward direction;

control circuitry means, connected between said second sensor and said anti-noise source, for receiving noise signals representing noise picked up by said second sensor and for substantially reducing the noise signals by controlling said anti-noise source so that it generates an anti-phase sound signal which causes substantial compensation of the received noise signals; and means for picking up a sound acquisition signal at said first sensor which is not connected to said control circuitry means and wherein, due to the directionality of the first and second sensors and a related difference in noise and sound control by the circuit consisting of the second sensor, the control circuitry means and the anti-noise source, the noise is weakened substantially, but the useful sound is weakened only slightly, by the generated anti-phase sound signal.

* * * * *